(12) United States Patent
Tonutti

(10) Patent No.: US 7,165,386 B2
(45) Date of Patent: Jan. 23, 2007

(54) VERTICALLY FOLDING RAKE

(75) Inventor: Carletto Tonutti, Udine (IT)

(73) Assignee: Tonutti S.p.A. Industria Macchine Agricole, Ramanzacco (IT)

( * ) Notice: Subject to any disclaimer, the term of this patent is extended or adjusted under 35 U.S.C. 154(b) by 0 days.

(21) Appl. No.: 10/986,702

(22) Filed: Nov. 12, 2004

(65) Prior Publication Data

US 2005/0126154 A1 Jun. 16, 2005

Related U.S. Application Data

(60) Provisional application No. 60/519,916, filed on Nov. 14, 2003.

(51) Int. Cl.
*A01D 78/00* (2006.01)
(52) U.S. Cl. ............... 56/375; 56/365; 56/377; 56/385
(58) Field of Classification Search ............... 56/377, 56/378–392, 396–398, 365
See application file for complete search history.

(56) References Cited

U.S. PATENT DOCUMENTS

| | | | |
|---|---|---|---|
| 1,244,982 A * | 10/1917 | Horst | .................. 172/543 |
| 2,603,053 A | 7/1952 | Lipe et al. | |
| 2,635,411 A | 4/1953 | Hicks | |
| 2,683,345 A | 7/1954 | Meyer | |
| 2,727,347 A | 12/1955 | Fenster et al. | |
| 2,895,278 A | 7/1959 | Huddle et al. | |
| 2,977,743 A | 4/1961 | Giles | |
| 3,004,378 A | 4/1961 | van der Lely et al. | |
| 3,021,904 A | 2/1962 | Larson | |

(Continued)

FOREIGN PATENT DOCUMENTS

AT 253846 4/1967

(Continued)

OTHER PUBLICATIONS

"H&S Bi-Fold Wheel Rake" Brochure, H&S Manufacturing Co., Inc., Marshfield, Wisconsin 54449, Oct. 1989.

(Continued)

*Primary Examiner*—Thomas B. Will
*Assistant Examiner*—Alicia Torres
(74) *Attorney, Agent, or Firm*—Gottlieb Rackman & Reisman

(57) ABSTRACT

A vertically folding rake assembly is configured for forming a windrow of cut agricultural crop material. The rake includes a trolley; a pair of rake arm suspension supports interconnected with the trolley and movable in a vertical plane between a raised position and a lowered position, and a vertically movable linkage arrangement configured for moving each of the rake arm suspension arrangements between the raised position and the lowered position. The rake further includes a rake arm suspended from each of the rake arm suspension supports. Each of the rake arm suspension supports includes a linkage pivotally connected to the trolley and a vertical support member that is pivotal about a vertical pivot axis and in support of the rake arm. The rake arm suspension arrangement further includes a pivot connection to provide pivoting movement of the rake arm about a horizontal axis, and a counterbalancing biasing arrangement to center each rake arm.

38 Claims, 8 Drawing Sheets

U.S. PATENT DOCUMENTS

| | | |
|---|---|---|
| 3,529,411 A | 9/1970 | Johnston et al. |
| 3,568,423 A | 3/1971 | Hale et al. |
| 3,948,028 A | 4/1976 | Reber |
| 4,077,189 A | 3/1978 | Hering |
| 4,179,872 A | 12/1979 | Gerlinger |
| 4,182,103 A | 1/1980 | McNutt |
| 4,183,198 A | 1/1980 | Sligter |
| 4,245,458 A | 1/1981 | Smith |
| 4,324,093 A | 4/1982 | van der Lely et al. |
| 4,370,846 A | 2/1983 | Arnold |
| 4,541,532 A | 9/1985 | Wilson |
| 4,723,402 A | 2/1988 | Webster et al. |
| 4,753,063 A * | 6/1988 | Buck ........................ 56/377 |
| 4,785,614 A | 11/1988 | Schoenherr |
| 4,864,809 A | 9/1989 | Van Der Lely et al. |
| 4,932,197 A | 6/1990 | Allen |
| 4,947,631 A | 8/1990 | Kuehn |
| 4,974,407 A | 12/1990 | Rowe et al. |
| 4,977,734 A | 12/1990 | Rowe et al. |
| 5,062,260 A | 11/1991 | Tonutti |
| 5,065,570 A | 11/1991 | Kuehn |
| 5,127,216 A | 7/1992 | Kelderman |
| 5,155,986 A | 10/1992 | Kelderman |
| 5,177,945 A | 1/1993 | Tonutti |
| 5,231,829 A | 8/1993 | Tonutti |
| 5,263,306 A | 11/1993 | Tonutti |
| 5,305,590 A | 4/1994 | Peeters |
| 5,313,772 A | 5/1994 | Tonutti |
| 5,400,578 A * | 3/1995 | Galanti ........................ 56/341 |
| 5,404,702 A | 4/1995 | Lewis |
| 5,493,853 A | 2/1996 | Tonutti |
| 5,540,040 A | 7/1996 | Peeters |
| 5,598,691 A | 2/1997 | Peeters |
| 5,615,545 A | 4/1997 | Menichetti |
| 5,685,135 A | 11/1997 | Menichetti |
| 5,752,375 A | 5/1998 | Tonutti |
| 5,784,873 A * | 7/1998 | Aron ........................ 56/377 |
| 5,899,055 A | 5/1999 | Rowse et al. |
| 5,918,452 A | 7/1999 | Kelderman |
| 5,930,988 A | 8/1999 | Hanson |
| 5,956,934 A * | 9/1999 | Wright et al. .............. 56/377 |
| 5,966,916 A | 10/1999 | Laing |
| 6,212,866 B1 | 4/2001 | Rowse et al. |
| 6,314,710 B1 | 11/2001 | Tonutti |
| 6,405,517 B1 | 6/2002 | Peeters et al. |
| 6,543,212 B2 | 4/2003 | Tonutti |
| 2003/0233820 A1 | 12/2003 | Menichetti |
| 2004/0107687 A1 | 6/2004 | Magnini |

FOREIGN PATENT DOCUMENTS

| | | |
|---|---|---|
| AU | 7545581 | 3/1982 |
| FR | 1267483 | 6/1961 |
| FR | 1373390 | 8/1964 |
| GB | 2100567 | 1/1983 |

OTHER PUBLICATIONS

"Mounted Side-Delivery Rake" Brochure, Sitrex Agricultural Machinery, Zona Industriale, 06018 Trestina, Italy, 1994.

"Columbia TR68, TR79 Hay Rake, Pull Type", Sitrex Agricultural Machinery, Zona Industriale, Via. L, Pacioli, 22-06018 Trestina, Italy, 1994.

* cited by examiner

VERTICALLY FOLDING RAKE

CROSS-REFERENCE TO RELATED APPLICATIONS

This application claims the benefit of U.S. Provisional Application Ser. No. 60/519,916, filed Nov. 14, 2003.

FIELD OF THE INVENTION

This invention relates to a folding rake for raking a cut crop material into a windrow, and more particularly to a rake having a vertically movable linkage arrangement configured to move the rake between an operative position for raking crop material and an inoperative, stowed position for transport or storage.

BACKGROUND AND SUMMARY OF THE INVENTION

In the prior art, it is generally known to construct a foldable rake that includes a trolley adapted for connection to a tow vehicle. The foldable rake includes rake arms carrying a number of rake elements (e.g. rake wheels, etc.) which are operable to direct crop material inwardly as the rake is pulled by the tow vehicle across the field. An example of a foldable rake is illustrated in U.S. Pat. No. 6,314,710 to Tonutti. The '710 patent discloses a foldable rake that includes a cylinder assembly in combination with an actuator configured to extend and retract along a longitudinal axis of the rake in moving one or more of the rake wheels between an inoperative and an operative position.

It is an object of the present invention to provide a vertically folding rake assembly that includes a vertically movable linkage arrangement configured to move the rake elements between a raised, inoperative position and a lowered, operative position. It is a further object of the present invention to provide a suspension-type support arrangement for the rake arms of a rake, in which the rake arms are mounted to a support member that is pivotal about a vertical axis. It is a further object of the invention to provide a rake arm suspension arrangement that includes a pivot connection for providing pivoting movement of each rake arm, which carries the rake elements, about a generally horizontal pivot axis. It is a further object of the invention to provide a counterbalanced biasing arrangement in association with the rake arm suspension arrangement for biasing the rake arm toward a centered position.

In accordance with one aspect of the invention, one embodiment of a rake includes a trolley and a rake arm suspension support arrangement interconnected with the trolley and movable between a raised position and a lowered position. The rake arm suspension support arrangement includes a pair of linkages and a pair of rake arm supports. The linkages are movable in a generally vertical plane. Each rake arm support is pivotally interconnected by a bracket with one of the linkages for movement about a generally vertical pivot axis. A preferred bracket generally includes a pair of plates configured to receive each linkage therebetween. A rake arm carrying a raking means or element (e.g., a rake wheel) is suspended from each rake arm support by a vertical support member.

Each rake arm support includes a horizontal support member interconnected with the vertical support member. The horizontal support member includes a collar that defines the generally vertical pivot axis of the vertical support member. The rake arms are generally suspended from a lower end of each of the vertical support members.

The rake arm suspension arrangement for suspending each rake arm from the trolley further includes a pivot connection for providing pivoting movement of the rake arm about a generally horizontal pivot axis. The pivot connection includes a horizontal pivot pin in combination with a pivot plate pivotably mounted to the horizontal pivot pin. The lower end of each of the vertical support members includes a slot to receive the pivot pin, and the pivot plate is fixed to the rake arm. This arrangement allows the rake arm to pivot about a horizontal pivot axis defined by the pivot pin.

The rake arm suspension arrangement further includes a counterbalanced biasing arrangement associated with each rake arm for biasing the rake arm toward a centered position. The counterbalanced biasing arrangement includes a first biasing assembly and a second biasing assembly positioned on opposite sides of each vertical support member. Each of the first and second biasing assemblies is connected by a bracket to the vertical support member. Each first and second biasing assembly includes a spring that extends generally parallel to the vertical support member between the bracket and the rake arm. The first and second biasing assemblies each further includes a spring compression adjustment feature, to vary the biasing force applied by the spring to the rake arm. The spring compression adjustment feature may include a bolt and a locking nut securing the bolt to one of the first and second brackets. The bolt is configured to extend into an interior defined by one of the springs. The spring compression adjustment feature further includes a tightening nut and a washer located between the tightening nut and the spring. The tightening nut is received by and configured to move along the bolt to adjust the position of the washer and the end of the spring, to thereby selectively adjust the compression of the spring. The lower end of the spring may be secured by a plate to the rake arm.

The rake preferably also includes a front rake wheel mounted at a forward end defined by each rake arm. The front rake wheel is movable between a raised, inoperative position and a lowered, operative position relative to the rake arm in accordance with crop conditions. A front rake arm support member carries the front rake wheel on each of the rake arms. The front rake arm support member is pivotally connected by a stub shaft that is pivotably mounted to a sleeve located at the front end of the rake arm. A coupling is received through openings in the stub shaft and aligned openings in the sleeve so as to secure the front rake wheel in the raised, inoperative position or the lowered, operative position relative to the rake arm.

The rake preferably also includes a lifting and lowering means interconnected with the rake arm suspension support arrangement for moving the one or more rake arms between a raised, inoperative position and a lowered, operative position. The lifting and lowering means includes a vertically movable actuator arrangement interconnected between the trolley and each the linkages. The vertically movable actuator arrangement includes an upright member and a guide member received within a passage defined by the upright member in a telescoping manner. The upright member may be mounted between first and second mounting plates carried by the trolley. The guide member is configured to move in a vertical direction relative to the upright member.

The vertically movable actuator arrangement also includes an operating mechanism for moving the actuator arrangement in a vertical direction. In one form, the operating mechanism is a cylinder assembly having a cylinder end and a rod end that is extendible and retractable from the cylinder end. The cylinder end of the cylinder assembly is connected to the trolley, and the rod end of the cylinder assembly is connected by a pin to the guide member such that extension and retraction of the cylinder assembly causes extension and retraction of the guide member in a telescoping manner and in a vertical direction relative to the upright member. The cylinder end of the cylinder assembly may be secured by a mounting bracket connected to one of the plates between which the upright member is located. A reinforcing bar can be attached between the mounting bracket and the trolley to add rigidity to the support structure. The vertically movable actuator arrangement further includes front and rear pairs of actuating links, each of which has a lower end pivotably connected to one of the linkages. An upper end of each of the actuating links is connected to the rod end of the cylinder assembly via a pin. The actuating links include overlapping slots that receive the pin therethrough, such that extension of the cylinder assembly lifts the upper end of each of the front and rear actuating links and the pair of linkages attached thereto.

The rake further preferably includes a pair of control members, each of which is interconnected between the trolley and each rake arm support. The pair of control members are configured to move the pair of rake arm supports apart from one another when the linkages are lowered, and to move the rake arm supports together toward one another when the linkages are raised.

The rake arm suspension arrangement further includes a windrow width adjustment arrangement for varying the angle defined between the rake arms when the rake arms are in the lowered, operative position. The adjustment arrangement may include a turnbuckle assembly interconnected with each of the pair of rake arms, which is configured such that adjustment of a length of the turnbuckle assembly selectively varies an angle defined between the rake arms when the rake arms are in the lowered, operative position. The vertical support of the rake arm suspension arrangement includes a head disposed above the collar of the horizontal support member. The head is connected to an arm extending radially outward from the collar. A first coupling of the turnbuckle assembly is connected at the arm and a second coupling of the turnbuckle assembly is connected at the horizontal support member. The arm includes a first opening disposed radially outward from a second opening relative to the head. The first coupling of the turnbuckle assembly is connected to the arm by a pin inserted in the first opening, which allows the rake arms to pivot apart from each other when the rake arms are moved to the lowered, operative position. Alternatively, the first coupling of the turnbuckle assembly is connected by the pin inserted in the second opening when the rake arms are positioned in the raised, inoperative position. The collar includes a tab having an opening generally aligned with the second opening of the arm, such that pin engages the tab in a manner that restrains movement of the rake arms when the rake arms are in the raised, inoperative position.

In accordance with another aspect of the invention, a method of operating a rake for movement between a transport position and an operating position for creating a windrow of cut crop material in a field is provided. The method includes the steps of actuating a vertically movable linkage arrangement connected so as to selectively raise and lower a suspension arrangement in support of one or more rake arms carrying rake means; and selectively securing the suspension arrangement in a raised, inoperative position or positioning the suspension arrangement in a lowered, operative position. The method can further include the steps of actuating the vertically movable linkage arrangement by operation of a cylinder assembly configured to move the vertically movable linkage arrangement in a vertical direction; and pivoting a horizontal support of the suspension arrangement about a generally vertically axis so as to move the suspension arrangement relative a central axis of the rake. The method may include locking a rake arm and a vertical support carrying the raking means so as to restrain pivoting movement of the rake arm while the rake is in the inoperative position. The rake arm is moved to the lowered, operative position by retracting the cylinder assembly so as to lower the suspension arrangement and associated raking means; pivoting the suspension arrangement in an outward direction from the central axis of the rake while lowering the suspension arrangement; and pivoting a rake arm in support of the raking means to an open position for creating the windrow of cut crop material as the rake is moved along the ground. The method may further include engaging the suspension arrangement with a cushioned stop member attached to a trolley in support of the suspension arrangement and the raking means when the rake arm is moved to the lowered, operative position.

While all of the features of the present invention can be incorporated together into a rake to enhance operation, it is understood that the one or more of the features of the invention may be utilized separately from each other or in combination with other rake features, and that each functions to enhance rake operation on its own.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 2:
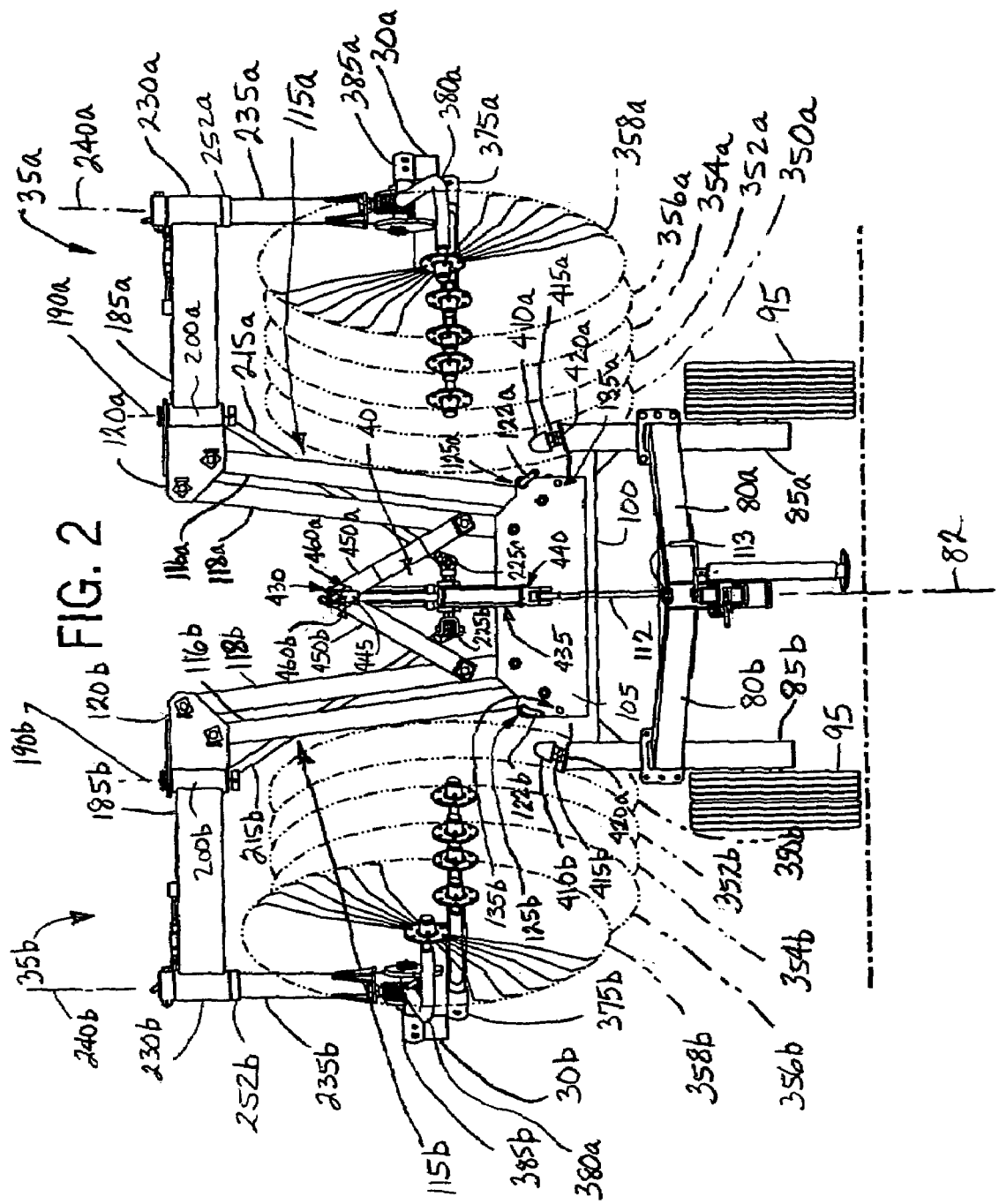
FIG. 2 is a front elevation view of the rake of FIG. 1.
Figure 3:
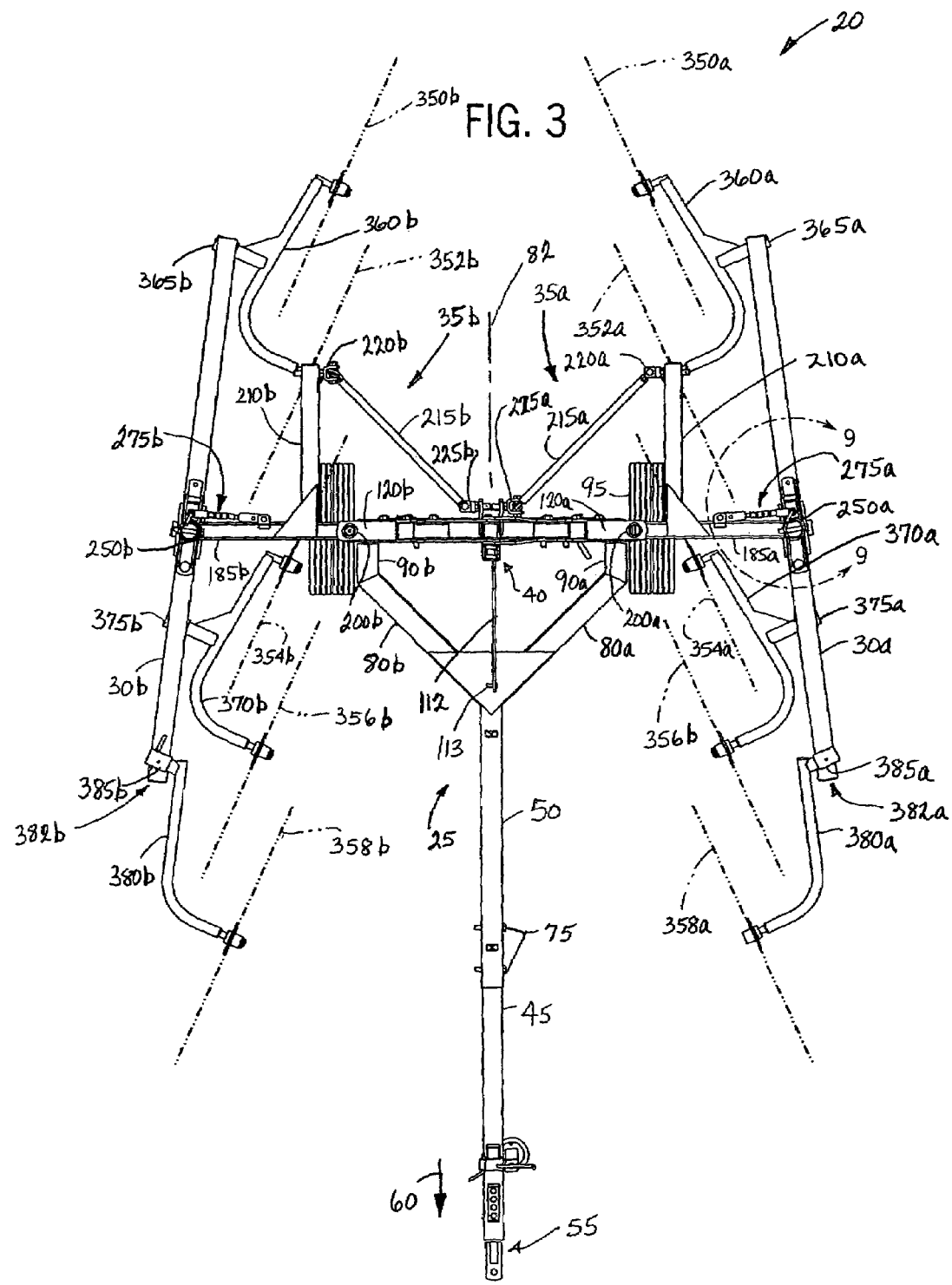
FIG. 3 is a top plan view the rake of FIG. 1.
Figure 4:
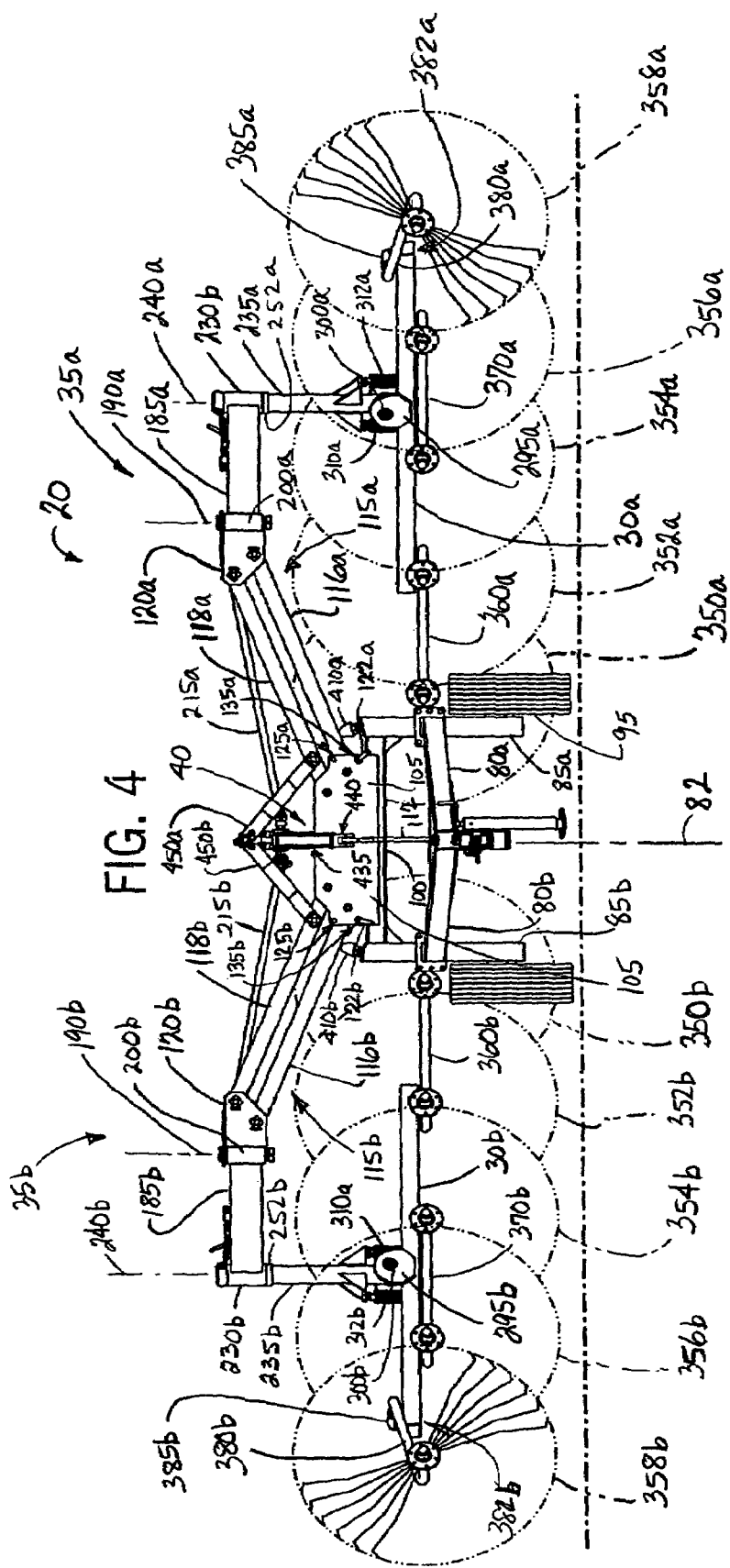
FIG. 4 is a front elevation view of the rake of FIG. 1, showing the rake arms in a lowered, operative position.
Figure 5:
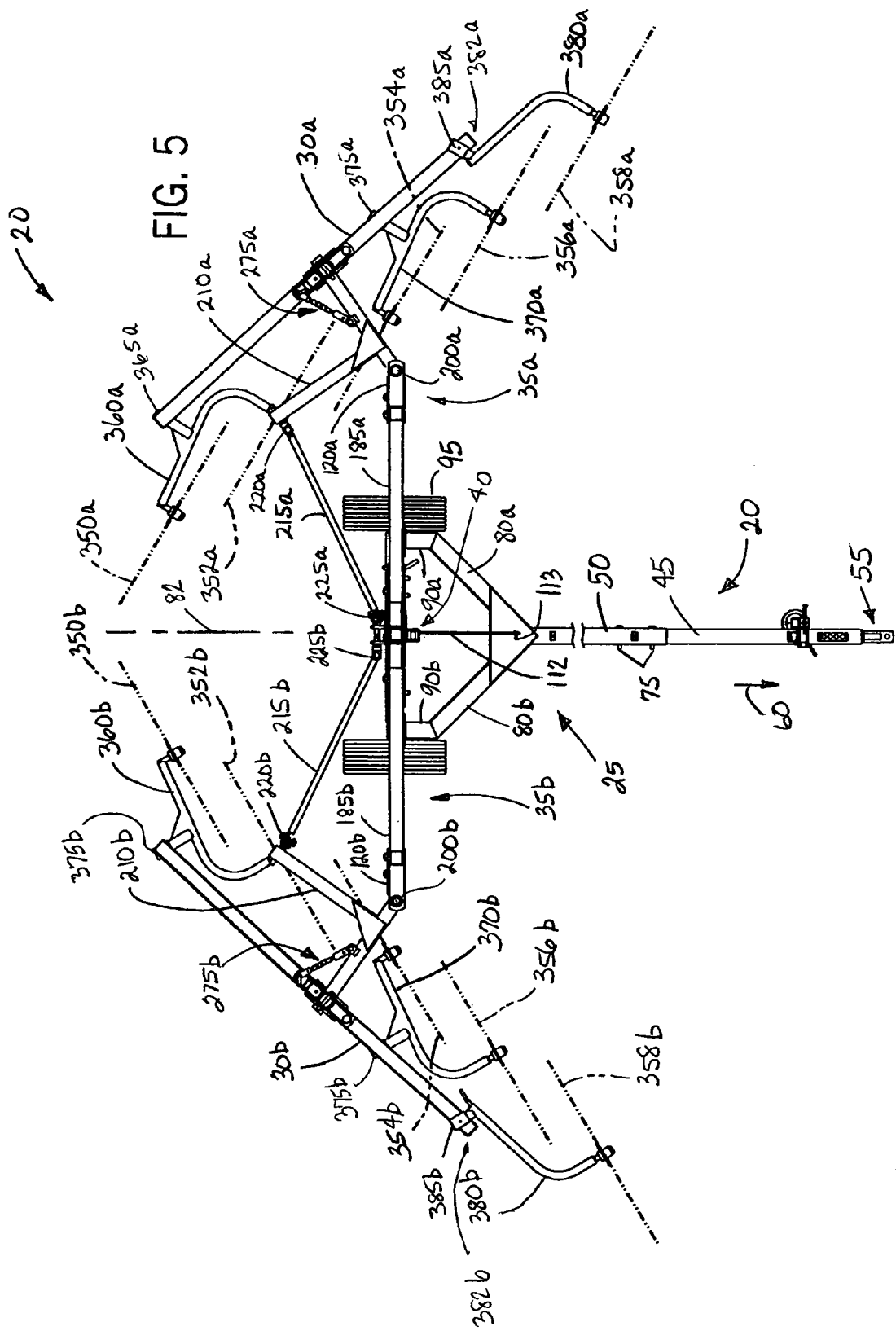
FIG. 5 is a top plan view of the rake of FIG. 4, showing the rake arms in the lowered, operative position.

Referring to FIGS. 1–6, a vertically folding rake 20 generally includes a trolley assembly 25, and a pair of rake arms 30a and 30b mounted by a pair of suspension-type arm supports 35a and 35b, respectively, to the trolley assembly 25. The rake 20 further includes an operating mechanism 40 that is interconnected between the trolley assembly 25 and the arm supports 35a and 35b. In a manner to be explained, the operating mechanism 40 is configured to move the rake arms 30 and 30b between a raised, inoperative position (as shown in FIGS. 1–3 and 6) for transport or storage, and a lowered, operative position (as shown in FIGS. 4 and 5) for raking a field of cut crop material so as to form windows of crop material.

1. Trolley Assembly

Figure 1:
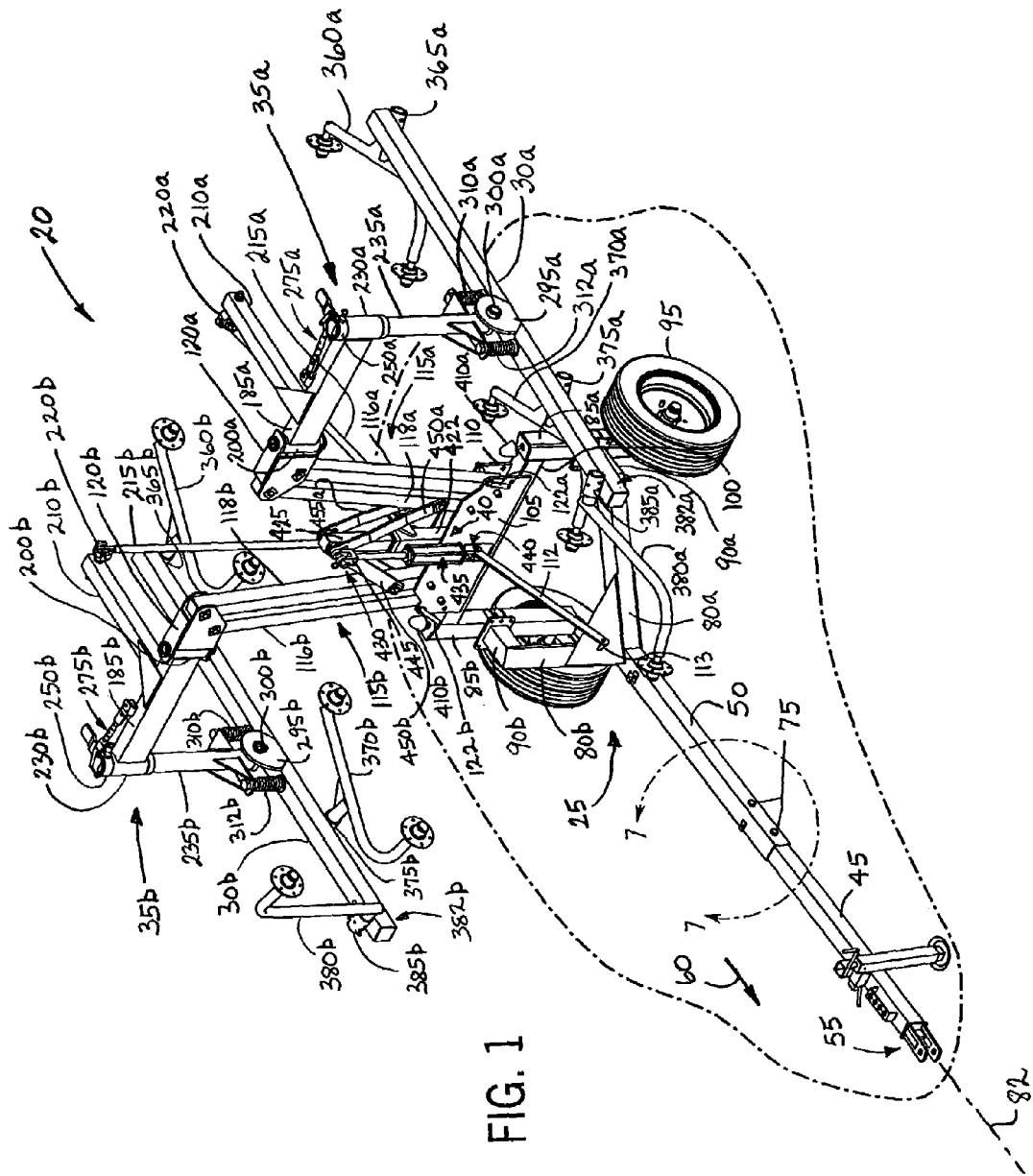
FIG. 1 is an isometric view of a rake of the present invention showing the rake arms in a raised, inoperative position for transport or storage.
Figure 7:
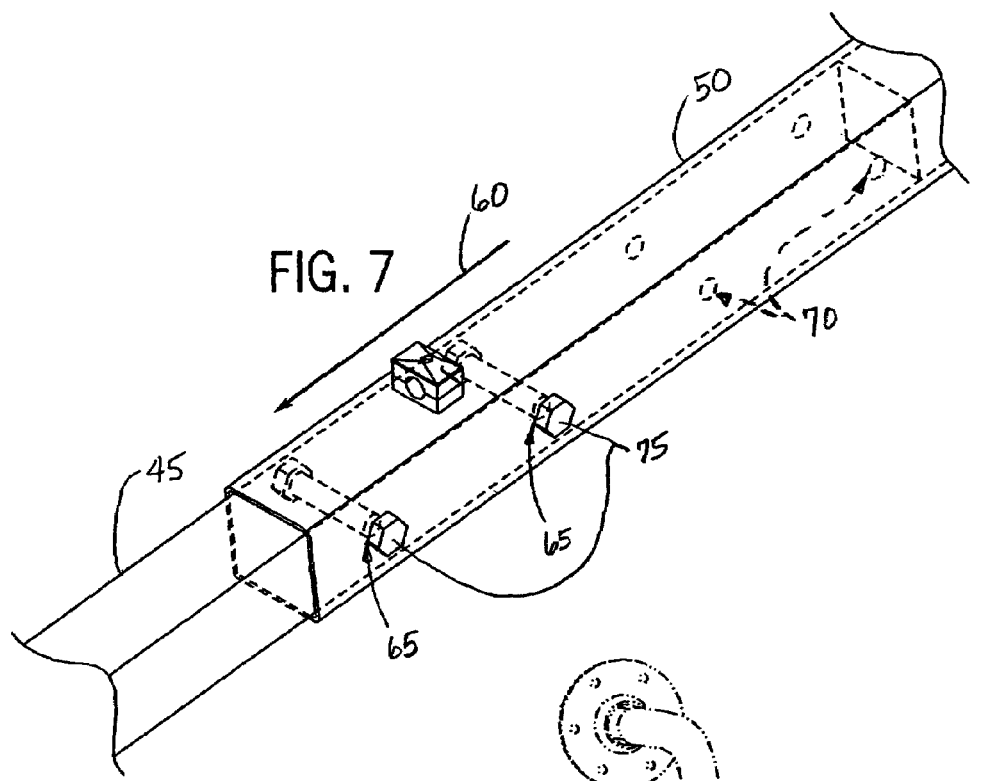
FIG. 7 is an enlarged partial isometric view of a draw bar incorporated into the rake, with reference to line 7—7 of FIG. 1.

Referring to FIGS. 1–3 and 7, the trolley assembly 25 is generally configured as a transport arrangement for the rake 20. As shown in FIGS. 1 and 3, the preferred trolley assembly includes a front drawbar member 45 and a rear drawbar member 50. A forward end of the front drawbar member 45 includes a standard hitch coupling 55 adapted for connection, in a known manner, to a tow vehicle (e.g., a tractor) which is operable to draw the rake 20 through a field of cut crop material in a forward direction of travel (illustrated by arrow 60). The rear drawbar member 50 is generally tubular-shaped and defines a passage to receive a rearward end of the front drawbar member 45, such that the front drawbar member 45 is engaged with the rear drawbar member 50 in a telescoping manner. As shown in FIG. 7, the vertical walls of the rear drawbar member 50 include a pair of aligned openings 65. The vertical walls of the front drawbar member 45 include axially spaced sets of pairs of aligned openings 70 located such that each pair of openings 70 has the same spacing as the pair of aligned openings 65 in the rear drawbar member 50. A pair of cross members, such as threaded bolts 75 or other connection members, are engaged through the aligned openings so as to fix the front drawbar member 45 in position relative to the rear drawbar member 50. The openings 65 in the vertical walls of the rear drawbar member 50 can be selectively placed into alignment with any selected set of aligned openings 70 in the front drawbar member 45 in a manner so as to selectively adjust the overall length defined by the front drawbar member 45 and the rear drawbar member 50.

Referring to FIGS. 1–3, the rear end of the rear drawbar member 50 is connected to a pair of rearwardly divergent trolley frame members 80a and 80b. The divergent frame members 80a and 80b generally form a V-shaped structure centered about a central axis 82 of the rake 20 when viewed in a top plan view (See FIG. 3). The trolley assembly 25 further includes a pair of vertical frame members 85a and 85b (See FIG. 2). As shown in FIG. 3, the vertical frame member 85a is secured to the rearwardly divergent frame member 80a via a short axial frame member 90a, and the vertical frame member 85b is secured to the rearwardly divergent frame member 80b by a short axial frame member 90b. A wheel 95 is rotatably mounted at the lower end of each vertical frame member 85a and 85b. A transverse upper frame member 100 extends between and interconnects the upper ends of the vertical frame members 85a and 85b. A front mounting plate 105 and a rear mounting plate 110 are secured to the front and rear vertical walls of the upper frame member 100, respectively, and extend upwardly above the upper horizontal wall of the upper frame member 100.

A reinforcing bar 112 is included to impart rigidity to the overall support structure of the trolley assembly 25 against forces caused by operation of the rake 20 in the field and during transport of rake 20. Reinforcing bar 112 generally includes an upper end and a lower end. The upper end of the reinforcing bar 112 is secured to the mounting plate 105. The lower end of the reinforcing bar 112 is connected to a gusset member 113 secured to the frame members 80a and 80b and the rear drawbar member 50 of the trolley assembly 25.

2. Rake Arm Suspension Arrangement

Referring to FIGS. 1–6, the suspension-type arm supports 35a and 35b generally provide a rake arm suspension arrangement configured to support the rake arms 30 and 30b from the trolley assembly 25. As shown in FIGS. 1–2, 4, and 6, the preferred suspension-type supports 35a and 35b include a pair of linkages 115a and 115b located one on either side of the central axis 82 of the trolley assembly 25. The linkages 115a and 115b are of a parallel bar-type, such that linkage 115a includes a lower bar 116a and an upper bar 118a, and linkage 115b includes a lower bar 116b and an upper bar 118a. Relative to the central axis 82, the inner ends of each of the lower and upper bars 116a and 118a of linkage 115a and the inner ends of the lower and upper bars 116b and 118b of linkage 115b are pivotably mounted to and between the front and rear mounting plates 105 and 110. The outer ends of each of the lower and upper bars 116a and 118a of linkage 115a and the outer ends of each of the lower and upper bars 116b and 118b of linkage 115b are pivotably mounted to a pair of linkage plate brackets 120a and 120b, respectively.

Figure 6:
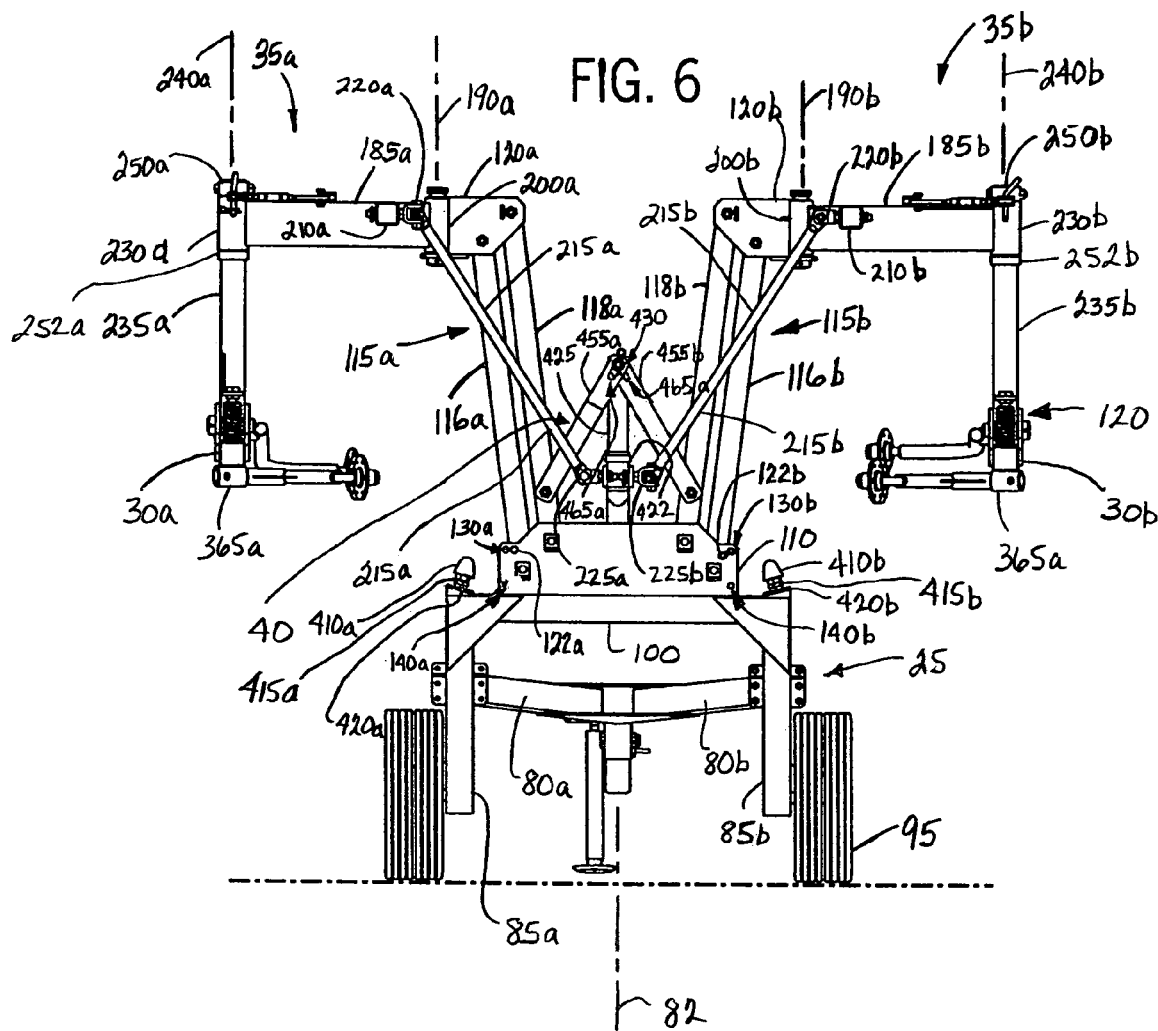
FIG. 6 is a rear elevation view of the rake of FIG. 1, showing the rake arms in the raised, inoperative position and the rake wheels removed.

As illustrated in FIGS. 1, 2, and 6, linkages 115a and 115b are maintained in the raised, operative position via transport pins 122a and 122b engaged within upper openings 125a and 125b in the front mounting plate 105 and aligned openings 130a and 130b in the rear mounting plate 110. As illustrated in FIG. 4, when linkages 115a and 115b are in the lowered, operative position, the transport pins 122a and 122b are removed from the upper openings 125a and 125b, respectively, and received within a pair of lower openings 135a and 135b in the front mounting plate 105 and an aligned pair of openings 140a and 140b in the rear mounting plate 110 (see FIG. 6). In this manner, the transport pins 122a and 122b are maintained in an easily accessible location to be switched into the upper openings 125a and 125b when the linkages 115a and 115b, respectively, are raised to the inoperative position.

As shown in FIGS. 1–2, 4 and 6, the suspension-type arm supports 35a and 35b further include laterally extending horizontal support arms 185a and 185b. The horizontal support arm 185a is mounted for movement about a vertical pivot axis 190a, and the horizontal support arm 185b is mounted for movement about a vertical pivot axis 190b. The axes 190a and 190b are generally defined at the outer ends of linkage plate brackets 120a and 120b by a pair of collars 200a and 200b, respectively. Each of the linkage plate brackets 120a and 120b generally includes a pair of plate structures to receive the outer ends of the lower bars 116a, 116b and upper bars 118a, 118b, respectively, therebetween.

Referring to FIGS. 1, 3, and 5, a pair of control arms 210a and 210b extend in a rearward direction, relative to the forward direction of travel 60, from the horizontal support arms 185a and 185b, respectively. As shown in FIGS. 3 and 5, a pair of control rods 215a and 215b of fixed-length are pivotally mounted between a pair of mounting brackets 220a and 220b secured at the outer ends of the control arms 210a and 210b, respectively, and a pair of mounting brackets 225a and 225b secured to the trolley assembly 25. In this arrangement, the control rods 215a and 215b are operable to pivot the suspension-type arm supports 35a and 35b through control arms 210a, 210b, respectively, to thereby pivot rake arms 30a and 30b relative to one another upon raising and lowering of linkages 115a and 115b.

Referring to FIGS. 2, 4, and 6, vertical collars or sleeves 230a and 230b are secured to the outer ends of the horizontal support arms 185a and 185b, respectively. The upper ends of the depending vertical support members 235a and 235b are received within passages defined by the sleeves 230a and 230b, respectively, such that the vertical support members 235a and 235b are pivotally movable relative to the horizontal support arms 185a and 185b about vertical pivot axes 240a and 240b, respectively, which are coincident with the longitudinal axis defined by the sleeves 230a and 230b and the vertical support members 235a and 235b, respectively. A pair of heads 250a and 250b each are secured at the upper end of one of the vertical support members 235a and 235b, and rest on the upper edges above one of the sleeves 230a and 230b, respectively. A pair of collars 252a and 252b are engaged with the vertical support members 235a and 235b, respectively, adjacent the lower edge of the sleeves 230a and 230b and cooperate with the heads 250a and 250b to fix an axial position of the vertical support members 235a and 235b relative to the sleeves 230a and 230b, respectively.

Figure 9:
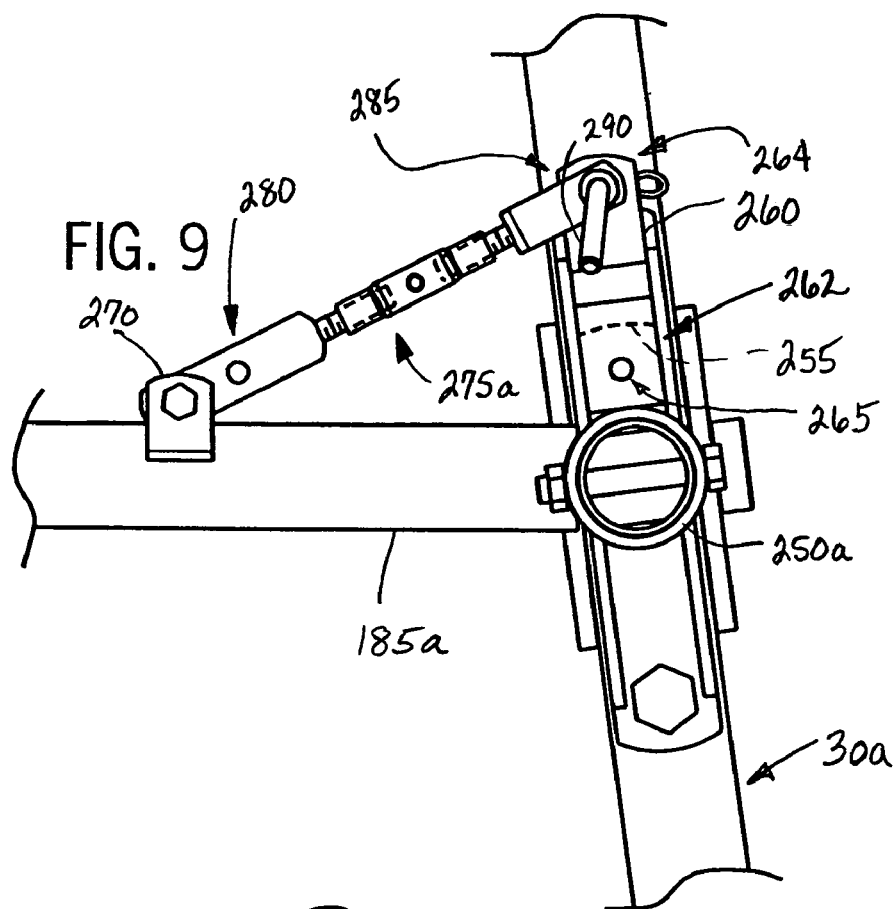
FIG. 9 is an enlarged partial top plan view of a windrow width adjustment assembly of the rake, with reference to line 9—9 in FIG. 3.

Referring to FIG. 9, the sleeve 230a (See FIGS. 2, 4, and 6) is attached with a radially outwardly extending tab 255 (shown in dashed lines). An arm 260 extends from the head 250a and includes a radially inward portion 262 that overlies the tab 255. The radially inward portion 262 of the arm 260 includes an opening 265 adapted to be selectively aligned with an opening in the tab 255. The arm 260 further includes a radially outward portion 264 that extends beyond the tab 255. An adjustable turnbuckle assembly 275a is engaged at a first coupling 280 with a bracket 270 secured to the support arm 185a. A second coupling 285 of the adjustable turnbuckle assembly 275b is selectively engaged with either the radially outward portion 264 of the arm 260 or with the radially inward portion 262 of the arm 260 and the tab 255 via a pin 290. The turnbuckle assembly 275a is operable to maintain a desired rotational position of the vertical support member 235a relative to the sleeve 230a for controlling an angle of the rake arm 30a relative to the forward direction of travel 60.

It should be understood that the above description with respect to the sleeve 235a, head 250a, and turnbuckle assembly 275a of suspension-type arm support 35a applies with equal force to the suspension-type arm support 35b.

Figure 10:
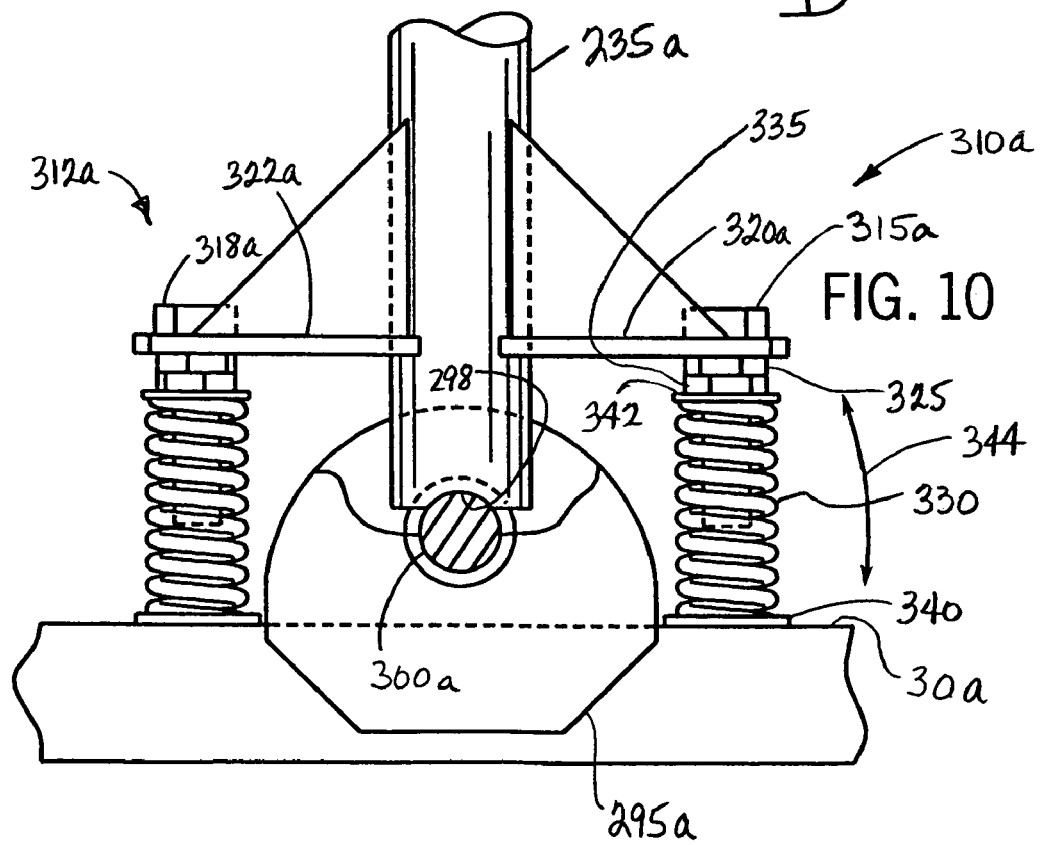
FIG. 10 is an enlarged partial side elevation view of a rake arm suspension assembly incorporated into the rake of FIG. 1.

Referring to FIGS. 1, 4 and 10, the rake arms 30a and 30b are engaged with the vertical support members 235a and 235b by a counterbalanced biasing arrangement that influences the rake arms 30a and 30b toward at a horizontally centered position and yet allows a limited range of vertical oscillation of the rake arms 30a and 30b about a horizontal axis. As shown in FIGS. 1 and 4, the rake arms 30a and 30b are mounted to the vertical support members 235a and 235b by pivot plates 295a and 295b, respectively. The pivot plates 295a and 295b generally extend upward from an upper surface of the rake arms 30a and 30b. A pair of pivot pins 300a and 300b define the generally horizontal axes about which the rake arms 30a and 30b are pivotable relative to the vertical support members 235a and 235b, respectively. The pivot pins 300a and 300b generally extend through openings in the pivot plates 295a and 295b, respectively. As shown in FIG. 10, pin 300a also extends through an aligned cutout or slot 298 at the lower end of the vertical support member 235a. Suspension or biasing spring assemblies 311a and 312a are located on either side of the pivot connection defined by the pin 300a with the rake arm 30a, and at the lower end of the associated vertical support member 235a.

Still referring to FIG. 10, the biasing spring assembly 310a is secured by bolts 315a and 318a to brackets 320a and 322a, respectively, located at the lower end of the vertical support member 235a. The threaded shank of the bolts 315a and 318a each receives a locking nut 325 in a manner that maintains the bolts 315a and 318a in engagement with the brackets 320a and 322a, respectively. The biasing assemblies 310a and 312a each further includes a coil spring 330 having a lower end that is secured to a foot plate 340 mounted to an upper wall of the rake arm 30a. The shank of the bolts 315a and 318a extends into an interior of the coil spring 330. A spring adjustment nut 335 is engaged along the threaded shank of the bolts 315a and 318a. A washer 342 is interposed between the spring adjustment nut 335 and the top end of the coil spring 330. With this arrangement, the spring adjustment nut 335 can be turned along the thread shank of the bolts 315a and 318a in a manner that adjusts the force applied by the spring 330 on the rake arm 30a, which tends to bias the rake arm 30a about a rake arm pivot axis defined by the pivot pin 300a. The biasing spring assemblies 310a and 312a are located on either side of the pivot pin 300a such that the spring forces counteract each other so as to maintain the rake arm 30a in a generally horizontal orientation and at a centered position while allowing the rake arm 30a to oscillate or rock (as illustrated by arrow 344) about the pivot pin 300a in a manner that accommodates fluctuations in the ground contour.

It should be understood that the above description with respect to the biasing assemblies 310a and 312a applies with equal force to the biasing spring assemblies 310b and 312b located on either side of the pivot pin 300b between the rake arm 30b and the lower end of the vertical support member 235b (See FIGS. 1 and 4).

3. Rake Arm

Referring to FIGS. 3–5, the rake arm 30a includes a series of finger wheel rakes 350a, 352a, 354a, 356a, and 358a, and the rake arm 30b includes a series of rake wheels 350b, 352b, 354b, 356b, and 358b (shown in dashed lines). Although the illustrated embodiment shows finger wheel rakes 350a, 352a, 354a, 356a, 358a, 350b, 352b, 354b, 356b, and 358b, it should be understood that any number or other satisfactory type of raking structure may be employed, such as basket-style rakes, tedder-type rakes, etc. and is not limiting on the invention. As shown in FIGS. 3 and 5, rear rake wheels 350a and 352a are carried by a rear L-shaped rake wheel support 360a pivotally interconnected via a stub shaft 365a with the rake arm 30a. Similarly, rear wake wheels 350b and 352b are carried by a rear L-shaped rake wheel support 360b pivotally interconnected via a stub shaft 365b with rake arm 30b. The forward pair of rake wheels 354a and 356a are secured to the rake arm 30a via a front rake wheel support 370a pivotally interconnected via a stub shaft 375a to the rake arm 30a. In a similar manner, the forward pair of rake wheels 354b and 356b are secured to the rake arm 30b via a front wheel support 370b pivotally interconnected via a stub shaft 375b to the rake arm 30b. With this rake mount arrangement, the rake wheels 350a, 352a, 354a, 356a are able to rotate about the supports 360a and 370a, respectively, and the rake wheels 350b, 352b, 354b, 356b rotate about the supports 360b and 370b, respectively, as the rake 20 is drawn across the field. Supports 360*a*, 370*a* and 360*b*, 370*b* in turn pivot relative to rake arms 30*a* and 30*b*, respectively, to accommodate fluctuations in ground contour.

Figure 8:
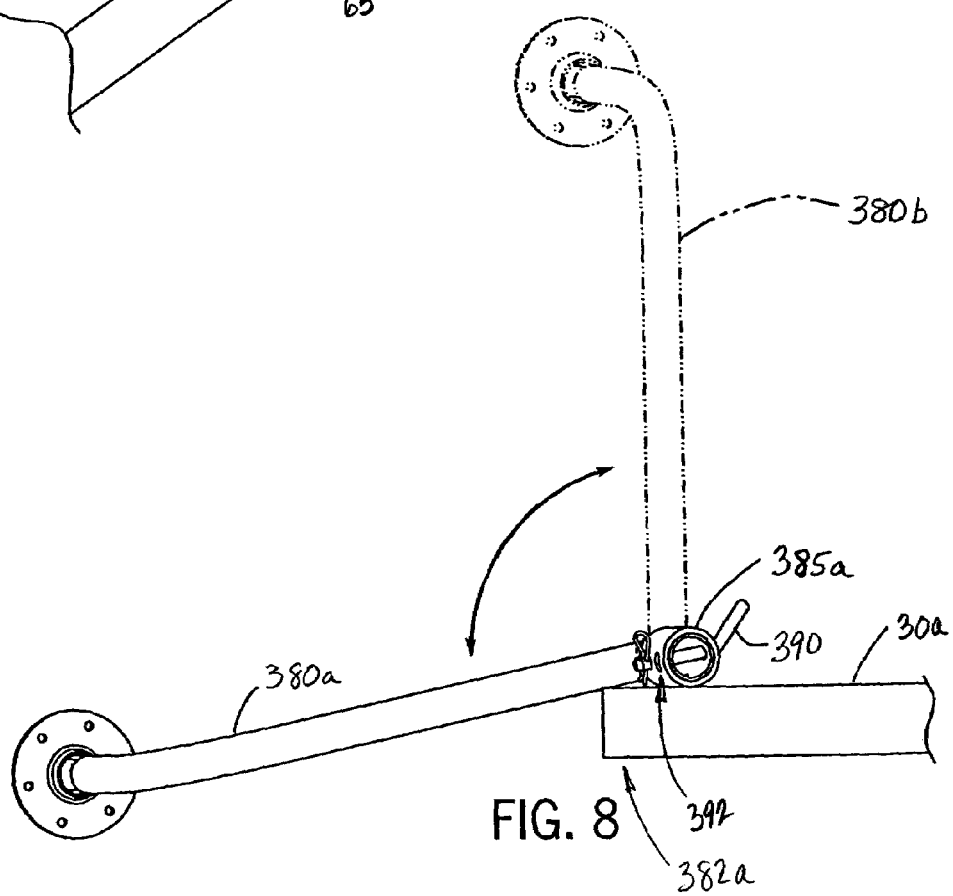
FIG. 8 is an enlarged partial side elevation view of a front rake wheel support of the rake of FIG. 1, showing the rake wheel support in the operative, lowered position and the inoperative, raised position (illustrated by dashed lines)

The front rake wheels 358*a* and 358*b* are secured by a pair of single arm front rake support members 380*a* and 380*b*, respectively, at a forward end 382*a* and 382*b* (relative to the direction of travel 60) and at a top surface of the rake arms 30*a* and 30*b* via stub shafts 385*a* and 385*b*, respectively. According to the conditions of the crop material, the front rake support members 380*a* are configured to be selectively positioned relative to the rake arms 30*a* in either a raised, inoperative position or in a lowered, operative position by a coupling pin 390 (FIG. 8) inserted through one of a series of openings 392 in the stub shafts 385*a* and aligned openings in the front rake support members 380*a*. It should be understood that the above description with respect to the front wheel 358*a* and the front rake support member 380*a* applies with equal force to the front wheel 358*b* and the front rake support member 380*b*. In heavy crop conditions, the front rake support members 380*a* and 380*b* are placed in the raised, inoperative position so as to prevent the front rake wheels 358*a* and 358*b*, respectively, from raking the crop material. In lighter crop conditions, the front rake support members 380*a* and 380*b* are placed in the lowered, operative position so as to enable the front rake wheels 358*a* and 358*b*, respectively, to rake the crop material.

4. Stop Members

Referring to FIG. 4, when the linkages 115*a* and 115*b* are moved to their lowered, operative positions, each of the lower linkage bars 116*a* and 116*b* rests on a resilient stop member or bumper 410*a* and 410*b*, respectively. The stop members 410*a* and 410*b* are mounted at the upper end of the vertical frame members 85*a* and 85*b*, respectively. The vertical position of the stop members 410*a* and 410*b* can be adjusted in a manner that adjusts the pressure applied by the rake finger wheels 350*a*, 352*a*, 354*a*, 356*a*, 358*a*, 350*b*, 352*b*, 354*b*, 356*b*, and 358*b* on the ground. Referring to FIG. 6, the stop members 410*a* and 410*b* are generally secured by a pair of adjusting screws 415*a* and 415*b*, respectively, received by a receiver at each of a pair of upper plates 420*a* and 420*b* mounted at the upper ends of the vertical frame members 85*a* and 85*b*, respectively. A shank of the adjusting screws 415*a* and 415*b* extends into an interior of the vertical frame members 85*a* and 85*b*, respectively. Locking nuts are configured to engage with the shanks of the adjusting screws 415*a* and 415*b*, and are selectively rotated into engagement with each upper plate 420*a* and 420*b* for fixing the vertical position of each stop member 410*a* and 410*b*.

5. Operating Mechanism

Referring to FIGS. 1, 2, 4 and 6, the operating mechanism 40 generally includes a vertically movable actuator arrangement interconnected between the trolley assembly 25 and each of the rake arm suspension-type arm supports 35*a* and 35*b*. The preferred vertically moveable actuator arrangement includes a cylindrical or tubular upright member 422 and a guide member 425 received within a passage defined by the upright member 422 in a telescoping manner. The tubular upright member 422 is mounted to and between the front and rear mounting plates 105 and 110, respectively. The guide member 425 is capable of telescoping movement in a vertical direction relative to the upright member 422. An axial pin or shaft 430 is mounted at the upper end of the guide member 425. The pin 430 includes a forwardly extending section and a rearwardly extending section relative to the forward direction of travel 60 (See FIG. 1). The forwardly extending section of the pin 430 extends from the front of the guide member 425. The rearwardly extending section of the pin 430 extends from a rear surface of the guide member 425.

Referring to FIGS. 1, 2 and 4, the operating mechanism 40 further includes an extendible and retractable actuating cylinder assembly 435 configured to move the actuator arrangement in the vertical direction. The actuating cylinder assembly 435 is interconnected between the front mounting plate 105 of the trolley assembly 25 and the pin 430. The actuating cylinder assembly 435 (e.g., hydraulic, pneumatic, etc.) generally includes a rod end that is extendible and retractable from a cylinder end in a known manner. The cylinder end of the cylinder assembly 435 is secured by a mounting bracket 440 to the front mounting plate 105. The reinforcing bar 112 can be attached at the mounting bracket 440 to provide structural support to the cylinder end of the cylinder assembly 435. The rod end of the cylinder assembly 435 is connected via a clevis 445 to the pin 430. With this arrangement, extension and retraction of the cylinder assembly 435 results in extension and retraction of the guide member 425 in a telescoping manner and in the vertical direction relative to the upright member 422.

Still referring to FIGS. 1, 2, and 4, the operating mechanism 40 further includes a pair of front actuating links 450*a* and 450*b* pivotably mounted at their lower ends to the front vertical walls of the upper bars 118*a* and 118*b* of linkages 115*a* and 115*b*, respectively, relative to the forward direction of travel 60 (See FIG. 1) of the rake 20. In a similar fashion as shown in FIG. 6, a pair of rear actuating links 455*a* and 455*b* are pivotably mounted at their lower ends of the rear vertical walls of the upper bars 118*a* and 118*b* of linkages 115*a* and 115*b*, respectively. Referring to FIG. 2, the upper ends of the front actuating links 450*a* and 450*b* include slots 460*a* and 460*b*, respectively. The slots 460*a* and 460*b* are positioned so as to be in overlapping relationship with each other and with the forwardly extending section of the axial pin 430 extending therethrough. Referring to FIG. 6, the rear actuating links 455*a* and 455*b* include slots 465*a* and 465*b*, respectively. The slots 465*a* and 465*b* are positioned in overlapping relationship with the rearward extending section of axial pin 430 extending therethrough. In this manner, extension of the cylinder assembly 435 functions to lift or raise the inner ends of the front actuating links 450*a* and 450*b* and the rear actuating links 455*a* and 455*b*, respectively, as well as raise the linkages 115*a* and 115*b* attached thereto. Retraction of the cylinder assembly 435 functions to lower the inner ends of front actuating links 450*a* and 450*b* and the rear actuating links 455*a* and 415*b*, as well as lower the linkages 115*a* and 115*b* attached thereto.

6. Operation

In operation, the rake 20 functions as follows. In the transport position, the linkages 115*a* and 115*b* of the rake 20 are positioned in a raised, operative configuration. To convert the rake 20, the transport pins 122*a* and 122*b* are first removed from the upper openings 125*a*, 125*b* in the mounting plate 105 and the upper openings 130*a*, and 130*b* in the mounting plate 110. Upon removal of the pins 122*a* and 122*b*, the cylinder assembly 435 is retracted in a manner which causes lowering of the guide member 425 into the passage defined by the upright member 422. The retracting cylinder assembly 435 also causes lowering of the actuating links 450*a*, 450*b*, 455*a* and 455*b* so as to spread and lower the linkages 115*a* and 115*b*. The linkages 115*a* and 115*b* are lowered so as to bring the lower bar 116*a* and 116*b* into engagement with the stop members 410*a* and 410*b*, respectively. As the linkages 115*a* and 115*b* are lowered, the control rods 215a and 215b act on the control bars 210a and 210b to pivot the horizontal arm supports 185a and 185b about the collars 200a and 200b and thereby move the rake arms 30a and 30b apart toward an open, operative position for creating windows of cut crop material.

During transport, each of the turnbuckle assemblies 275a and 275b is positioned by the pin 290 in the opening 265 at the inner portion 262 of the arm 260 and the aligned opening in the underlying tab 255 in a manner that maintains the rake arms 30a and 30b in a generally parallel relationship. To prepare the rake arms 30a and 30b for use, the operator removes the pin 290 from the opening 265 at the inner portion 262 of the arm 260 and the aligned opening in tab 255. The operator then repositions the outer coupling 285 of each of the turnbuckle assemblies 275a and 275b in a known manner such that the outer coupling 285 is in alignment with the opening at the outer portion 264 of the arm 260. Upon alignment, the operator inserts the pin 290 through the opening in the arm 260 and the aligned openings in the turnbuckle coupling 285. The length of the turnbuckle assemblies 275a and 275b can be adjusted in a known manner so as to place the rake arm 30a and 30b at a desired angle. Such adjustment in the angle of rake arms 30a and 30b functions to adjust the width of the windrow created by operation of the rake 20. The operator then places the front rake wheels 358a and 358b in either a raised position or a lowered position, as desired according to crop conditions, and draws the rake 20 behind a tow vehicle (not shown).

During movement of the rake 20 across the field, the individual rake wheels 350a, 352a, 354a, 356a, 350b, 352b, 354b, and 356b are configured to rotate about the support arms 360a, 370a, 360b and 370b, respectively, relative to the associated rake arm 30a and 30b, respectively. Supports 360a, 370a and 360b, 370b in turn pivot relative to rake arms 30a and 30b, respectively, to accommodate fluctuations in ground contour. Simultaneously, each of the rake arms 30a and 30b is able to rock or oscillate via the pivot connection provided by the pivot plates 295a and 295b and associated pivot pins 300a and 300b, also to accommodate fluctuations in the contour of the field. In addition, when the rake 20 encounters fluctuations in the ground contour during use which cause the linkages 115a and 115b to pivot upwardly, such movement of the linkages 115a and 115b is accommodated by the slots 460a and 460b in the front actuating links 450a and 450b and the slots 465a and 465b in the rear actuating links 455a and 455b, respectively, of the vertically movable actuator arrangement. Resilient bumpers 410a and 410b are configured to engage the lower bars 116a and 116b so as to provide a cushioned limit to a downward movement of the linkages 115a and 115b.

To convert the rake 20 from the lowered, operative configuration to the raised, transport configuration, the cylinder assembly 435 is extended so as to raise the linkages 115a and 115b via upward movement of the inner ends of the front actuating links 450a, 450b and the rear actuating links 455a and 455b caused by the upward extension of the guide member 425 from the upright member 422. As the linkages 115a and 115b are raised, the control rods 215a and 215b act on the control arms 210a and 210b, to pivot the horizontal arm supports 185a and 185b about the vertical pivot axes 190a and 190b defined by the collars 200a and 200b, respectively. Each of the horizontal arm supports 185a and 185b pivots inward toward an inoperative position exemplified by a reduced overall width of the rake 20. The transport pins 122a and 122b are inserted in the upper openings 125a, 130a, 125b and 130b of the mounting plates 105 and 110, respectively to maintain the linkages 115a and 115b in the raised, transport position. The operator removes the pin 290 from the opening 265 at the outer portion 264 of the arm 260. Upon removal of the pin 290, the operator adjusts the length of the turnbuckle assemblies 275a and 275b and repositions the outer coupling 285 of the turnbuckle assembly 275a and 275b so as to be in alignment with the opening 265 at the inner portion 262 of the arm 260 and the aligned opening in the tab 255. The operator then inserts the pin 290 through the opening 265 in the arm 260 and the aligned openings in the tab 255 and the coupling 285 of each of the turnbuckle assemblies 275a and 275b so as to lock the rake arms 30a and 30b against movement during transport.

Although the mechanism shown to lift the linkages 115a and 115b is described as a cylinder assembly 435, it should be understood that any other type of movable operating device may be employed, such as a linear actuator, a rodless cylinder assembly, a manual or motor-operated screw-type mechanism, or the like.

Various alternatives and embodiments are contemplated as being within the scope of the following claims particularly pointing out and distinctly claiming the subject matter regarded as the invention.

I claim:

1. A rake for raking agricultural crop material, the rake adapted to be towed by a tow vehicle in a forward direction of travel, comprising:
   a trolley;
   a pair of linkages interconnected with the trolley and movable in a generally vertical plane between a raised position and a lowered position;
   means for moving the linkages between the raised position and the lowered position;
   a pair of rake arm supports, wherein each rake arm support is suspended from one of the linkages and is pivotably interconnected therewith for movement about a generally vertical pivot axis, and wherein each rake arm support includes a horizontal support member that is pivotable about the generally vertical pivot axis;
   a rake arm, carrying a raking means, interconnected with each rake arm support, wherein the rake arms and the raking means are in a lowered operative position when the linkages are in the lowered position and are in a raised inoperative position when the linkages are in the raised position; and
   a pair of control members, wherein each of the control members is interconnected between the trolley and one of the rake arm supports, wherein the pair of control members are configured to pivot the pair of rake arm supports about the generally vertical pivot axes to an open position when the linkages are in the lowered operative position, and to pivot the pair of rake arm supports together about the generally vertical pivot axes to a closed position toward one another when the linkages are in the raised inoperative position;
   wherein the linkages and the rake arm supports are configured and arranged to maintain the rake arm supports in a suspended orientation during movement of the linkages between the raised inoperative position and the lowered operative position and when the linkages are in the raised position.

2. The rake as recited in claim 1, wherein each rake arm support includes a horizontal support member that remains in a horizontal orientation during movement of the rake arms between the lowered operative position and the raised inoperative position.

3. The rake as recited in claim 1, wherein each rake arm support includes a sleeve configured to receive the vertical support member interconnected with the rake arms.

4. A rake for raking agricultural crop material, comprising:
 a trolley for movement of the rake along the ground; a pair of rake arms; and
 a rake arm suspension arrangement for suspending each rake arm from the trolley, and including a pair of vertical support members, wherein each support member is configured to pivot about a vertical axis, and wherein each vertical support member has a lower end connected to one of the rake arms through a horizontal axis pivot connection; and
 a lifting and lowering means associated with the rake arm suspension arrangement for moving the rake arms between a raised, inoperative position and a lowered, operative position;
 wherein the rake arm suspension arrangement includes the horizontal axis pivot connection for providing pivoting movement of the rake arm about a generally horizontal pivot axis when the rake arm suspension arrangement is in the lowered operative position.

5. The rake of claim 4, wherein the horizontal axis pivot connection includes a pivot pin in combination with a pivot plate.

6. The rake of claim 4, further comprising;
 a counterbalanced biasing arrangement associated with each rake arm suspension arrangement for biasing each rake arm toward a centered position about the generally horizontal pivot axis.

7. The rake of claim 6, wherein the counterbalanced biasing arrangement includes a first biasing assembly and a second biasing assembly positioned on opposite sides of the horizontal pivot axis.

8. The rake of claim 7, wherein each rake aim suspension arrangement includes a vertical support member to which the rake arm is mounted, and wherein each of the first and second biasing assemblies is connected by a bracket to the vertical support member.

9. The rake of claim 8, wherein the first and second biasing assemblies each include a first spring and a second spring generally aligned with the vertical support member, wherein the first and second springs are positioned on opposite sides of the vertical support member.

10. The rake of claim 9, wherein the first and second biasing assemblies each further include a pair of bolts and a pair of locking nuts securing the pair of bolts to the first and second brackets, each of the pair of bolts extending into an interior of one of the first and second springs.

11. The rake of claim 10, wherein the first and second biasing assemblies each further include a pair of tightening nuts and a pair of washers biased between each of the tightening nuts and one of the first and second springs, wherein each tightening nut is received by and configured to move along each bolt in biasing manner against one of the washers and one of the first and second springs such that the tightening nut selectively adjusts the force of one of the first and second springs.

12. The rake of claim 9, wherein a lower end of each of the first and second springs is secured by a plate to the rake arm.

13. The rake of claim 4, wherein the lifting and lowering means comprises a vertically movable linkage arrangement interconnected between the trolley and the rake arm suspension arrangement.

14. The rake of claim 13, further comprising an opening and closing arrangement interposed between the trolley and the rake arm suspension arrangements for moving the rake arms apart to an open position when the linkages are operated to lower the rake arms and for moving the rake arms together to a closed position when the linkages are operated to raise the rake arms.

15. The rake of claim 4, wherein the rake arm suspension arrangement includes an adjustment arrangement for varying an angle defined between the rake arms when the rake arms are in the lowered, operative position.

16. The rake of claim 15, wherein the adjustment arrangement includes a turnbuckle assembly connected to each of the pair of rake arms, wherein adjustment of a length of the turnbuckle assembly selectively varies the angle defined between the rake arms in the operative position.

17. The rake of claim 4, wherein each of the pair of rake arms is carried by a vertical support member that is pivotal about a vertical axis.

18. The rake of claim 17, wherein each of the rake arm suspension arrangements includes a horizontal support member having a sleeve configured to receive the vertical support member.

19. The rake of claim 18, wherein each rake arm suspension arrangement includes an adjustment arrangement for varying an angle defined between the rake arms when the rake arms are in the lowered, operative position, wherein the adjustment arrangement includes a turnbuckle assembly connected to each of the pair of rake arms, wherein adjustment of a length of the turnbuckle assembly selectively varies the angle defined between the rake arms in the operative position, and wherein the vertical support member is secured to a head disposed above the sleeve, wherein the head is connected to an arm extending radially outward from the sleeve, and wherein a first coupling of the turnbuckle assembly is connected at the arm and a second coupling of the turnbuckle assembly is connected at the horizontal support member.

20. The rake of claim 19, wherein the arm, includes a first opening disposed radially outward relative to a second opening in the arm, wherein the first coupling of the turnbuckle assembly is connected to the arm by a pin inserted in the first opening when the rake arm is positioned in an operative position.

21. The rake of claim 20, wherein the sleeve is attached to a radially extending tab having an opening generally aligned with the second
 opening of the arm such that the pin engages the first coupling of the turnbuckle assembly with the arm and the tab in a manner that restrains movement of the rake arm.

22. A rake for raking agricultural crop material comprising:
 a trolley for movement of the rake along the ground; a pair of rake arms; and
 a rake arm suspension arrangement for suspending each rake arm from the trolley, wherein the rake arm suspension arrangement includes a horizontal axis pivot connection for providing pivoting movement of the rake arm about a generally horizontal pivot axis, wherein the rake arm suspension arrangement further includes a pair of vertical support members each configured to pivot about a vertical axis, each vertical support member having a lower end connected to one of the rake arms;
 wherein the pivot connection includes a pivot pin in combination with a pivot plate, and wherein the lower end of each of the vertical support members includes a slot to receive the pivot pin.

23. A rake for raking agricultural crop material, comprising:
a trolley for movement of the rake along the ground;
a pair of rake arms; and
a rake arm suspension arrangement for suspending each rake arm from the trolley, wherein the rake arm suspension arrangement further includes a horizontal axis pivot connection for providing pivoting movement of the rake arm about a generally horizontal pivot axis, wherein the rake arm suspension arrangement includes a pair of vertical support members each configured to pivot about a vertical axis, each vertical support member having a lower end connected to one of the rake arms;
wherein the pivot connection includes a pivot pin in combination with a pivot plate, and wherein the pivot plate is fixed to the rake arm.

24. A rake for raking agricultural crop material comprising:
a trolley for movement of the rake along the ground;
a pair of rake arms;
a rake arm suspension arrangement for suspending each rake arm from the trolley, wherein the rake arm suspension arrangement includes a horizontal axis pivot connection for providing pivoting movement of the rake arm about a generally horizontal pivot axis, wherein the rake arm suspension arrangement includes a pair of vertical support members each configured to pivot about a vertical axis, each vertical support member having a lower end connected to one of the rake arms; and
a counterbalanced biasing arrangement associated with each rake arm suspension support arrangement for biasing each rake arm toward a centered position,
wherein the counterbalanced biasing arrangement includes a first biasing assembly and a second biasing assembly positioned on opposite sides of each vertical support member.

25. A method of operating a rake having a plurality of raking means positioned at an operating position for creating a windrow of cut crop material in the field, the rake drawn across the field by a tow vehicle, the method comprising the steps of:
extending a vertically movable linkage arrangement by operation of a cylinder assembly, wherein the cylinder assembly is connected so as to raise a suspension arrangement carrying the plurality of raking means for creating the windrow of cut crop material;
securing the suspension arrangement in a raised, inoperative position: retracting the cylinder assembly so as to lower the suspension arrangement and associated raking means;
pivoting the suspension arrangement in an outward direction from a central axis of the rake while lowering the suspension arrangement;
pivoting the rake arm carrying the raking means to an open position for creating the windrow of cut crop material; and
receiving the suspension arrangement with a cushioned stop member attached to a trolley in support of the suspension arrangement and the raking means.

26. A rake for raking agricultural crop material, comprising:
a trolley for movement of the rake along the ground;
a pair of rake arms; and
a rake arm suspension arrangement for suspending each rake arm from the trolley, wherein the rake arm suspension arrangement includes a horizontal axis pivot connection for providing pivoting movement of the rake arm about a generally horizontal pivot axis;
wherein each rake arm suspension arrangement is interconnected with a lifting and lowering means for moving the rake arm between a raised, inoperative position and a lowered, operative position, wherein the lifting and lowering means comprises a vertically movable linkage arrangement interconnected between the trolley and each rake arm suspension arrangement, and wherein the vertically movable linkage arrangement includes:
an upright member, and
a guide member received within a passage defined by the upright member in a telescoping manner.

27. The rake of claim 26, wherein the upright member is mounted at and between a first mounting plate and a second mounting plate of the trolley.

28. The rake of claim 26, wherein the guide member is configured to move in a vertical direction relative to the upright member.

29. The rake of claim 28, wherein the lifting and lowering means further comprises a cylinder assembly having a cylinder end and a rod end that is extendible and retractable from the cylinder end.

30. The rake of claim 29, wherein the cylinder end of the cylinder assembly is connected to the trolley, and the rod end of the cylinder assembly is connected by a pin to an upper end of the guide member such that extension and retraction of the cylinder assembly causes extension and retraction of the guide member in a telescoping manner and in a vertical direction relative to the upright member.

31. The rake of claim 29, wherein the cylinder end of the cylinder assembly is secured by a mounting bracket connected at the upright member.

32. The rake of claim 31, wherein a reinforcing bar is attached between the mounting bracket and the trolley.

33. The rake of claim 26, wherein the vertically movable linkage arrangement further includes:
a pair of front actuating links each having a lower end pivotably connected to one of the linkages.

34. The rake of claim 33, wherein the vertically movable linkage arrangement further includes a pair of rear actuating links each having a lower end pivotably connected to one of the linkages.

35. The rake of claim 34, wherein an upper end of each of the rear actuating links includes a slot, wherein the slots are positioned so as to be in an overlapping relationship with each other and so as to receive a pin therethrough such that extension of the cylinder assembly lifts the upper end of each of the rear actuating links and the pair of linkages attached thereto.

36. The rake of claim 33, wherein an upper end of each of the front actuating links includes a slot, wherein the slots of the front actuating links are positioned so as to be in an overlapping relationship with each other and so as to receive a pin therethrough such that extension of the cylinder assembly lifts the upper end of each of the front actuating links and the pair of linkages attached thereto.

37. A rake for raking agricultural crop material, the rake adapted to be towed by a tow vehicle in a forward direction of travel, comprising:
a trolley;

a pair of linkages interconnected with the trolley and movable in a generally vertical plane between a raised position and a lowered position;

means for moving the linkages between the raised position and the lowered position;

a pair of rake arm supports, wherein each rake arm support is suspended from one of the linkages and is pivotably interconnected therewith for movement about a generally vertical pivot axis; and a rake arm, carrying a raking means, interconnected with each rake arm support, wherein the rake arms and the raking means are in a lowered operative position when the linkages are in the lowered position and are in a raised inoperative position when the linkages are in the raised position;

wherein the linkages and the rake arm supports are configured and arranged to maintain the rake arm supports in a suspended orientation during movement of the linkages between the raised inoperative position and the lowered operative position and when the linkages are in the raised position; and wherein each rake arm support includes a horizontal support member that remains in a horizontal orientation during movement of the rake arms between the lowered operative position and the raised inoperative position.

38. A rake for raking agricultural crop material, comprising:

a trolley for movement of the rake along the ground; a pair of rake arms; and a rake arm suspension arrangement for suspending each rake arm from the trolley; and a lifting and lowering means associated with the rake arm suspension arrangement for moving the rake arms between a raised, inoperative position and a lowered, operative position; and a counterbalanced biasing arrangement associated with each rake arm suspension arrangement for biasing each rake arm toward a centered position about the generally horizontal pivot axis;

wherein the rake arm suspension arrangement includes a horizontal axis pivot connection for providing pivoting movement of the rake arm about a generally horizontal pivot axis when the rake arm suspension arrangement is in the lowered operative position.

* * * * *